Figure 1:
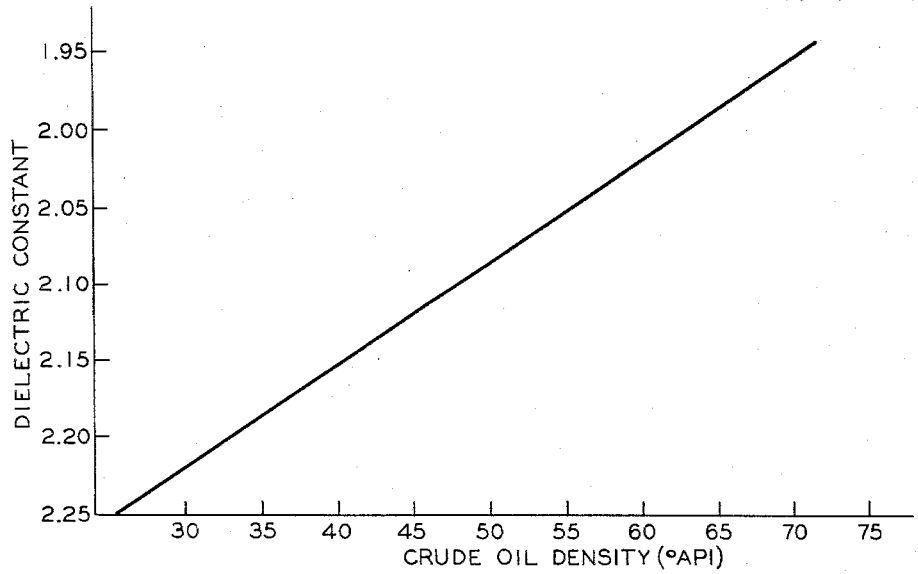

May 31, 1966  L. E. KUNTZ  3,253,606
ELECTRICAL MEASURING SYSTEM
Filed Jan. 2, 1962  2 Sheets-Sheet 1

INVENTOR.
L. E. KUNTZ
BY Young & Quigg
ATTORNEYS

May 31, 1966 L. E. KUNTZ 3,253,606

ELECTRICAL MEASURING SYSTEM

Filed Jan. 2, 1962 2 Sheets-Sheet 2

INVENTOR.
L. E. KUNTZ
BY
Young & Quigg
ATTORNEYS

United States Patent Office 3,253,606
Patented May 31, 1966

3,253,606
ELECTRICAL MEASURING SYSTEM
Louis E. Kuntz, Bartlesville, Okla., assignor to Phillips Petroleum Company, a corporation of Delaware
Filed Jan. 2, 1962, Ser. No. 163,507
4 Claims. (Cl. 137—115)

This invention relates to electrical measuring. In one aspect the invention relates to detection and analysis of materials in terms of the dielectric constant thereof. In another aspect the invention relates to an improved apparatus for determining variations in capacitance. In yet another aspect the invention relates to an improved apparatus for correcting a capacitance measuring cell output for changes in the composition of the dielectric of the capacitance measuring cell. In a still further aspect the invention relates to adjusting a capacitance measuring bridge network to compensate for changes in capacitance of the measuring cell due to changes in the specific gravity of the dielectric fluid.

The measurement of the dielectric properties of materials has become a valuable industrial and laboratory procedure for determining compositions. A detecting element in the form of an electrical condenser is disposed so that the material to be measured forms the dielectric. A measurement of the capacitance of the condenser thus provides information regarding the properties of the test material. This procedure can be employed to detect liquid levels, the moisture content of materials, the composition of materials, the density of materials, the specific gravity of materials, the basic sediment and water content of crude oil, and the thickness of sheets of the materials, for example. The accuracy of the measurement depends on the accuracy of the measurement of the capacitance of the resulting capacitor and the compensation for changes in capacitance of the capacitor due to changes in the density of specific gravity of the dielectric materials of the capacitor.

In accordance with the present invention there is provided a means of compensating a capacitance measuring bridge network for changes in the capacitance of the measuring cell due to changes in the specific gravity of the dielectric material of the measuring cell. This can be accomplished through the utilization of a first capacitor in one arm of the capacitance measuring bridge network to determine the dielectric constant of the dielectric material of the first capacitor at a given time and the utilization of a second capacitor in a second arm of the capacitance measuring bridge network, the capacitance of the second capacitor being a function of the specific gravity of the dielectric fluid of said first capacitor.

Accordingly, it is an object of the invention to provide an improved and simplified apparatus for measuring the capacitance of a capacitor. Another object of the invention is to provide a specific gravity compensating network. Another object of the invention is to provide an improved apparatus for detecting and analyzing materials in the terms of dielectric properties thereof. Another object of the invention is to provide a specific gravity compensating network for utilization in measuring the dielectric properties of a fluid. A still further object of the invention is to provide improved apparatus for measuring the basic sediment and water content of crude oil.

Further objects, aspects, and advantages of the invention will be apparent from a study of the disclosure, the drawings and the appended claims.

Figure 2:
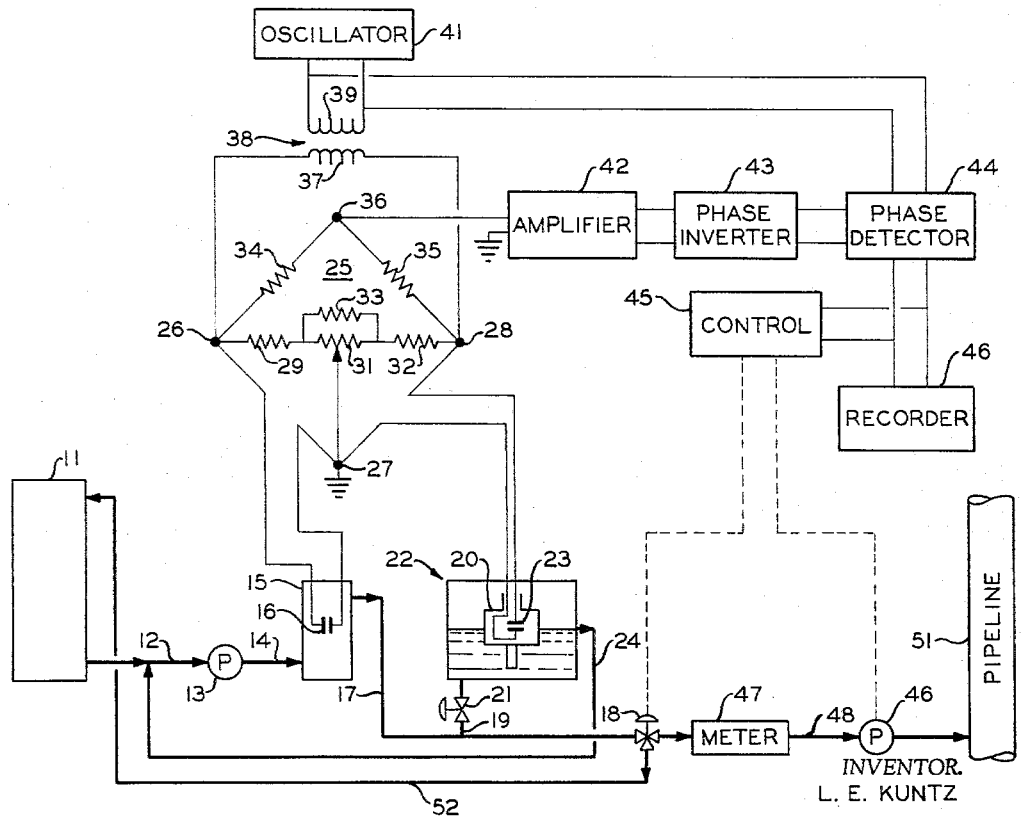
Figure 3:
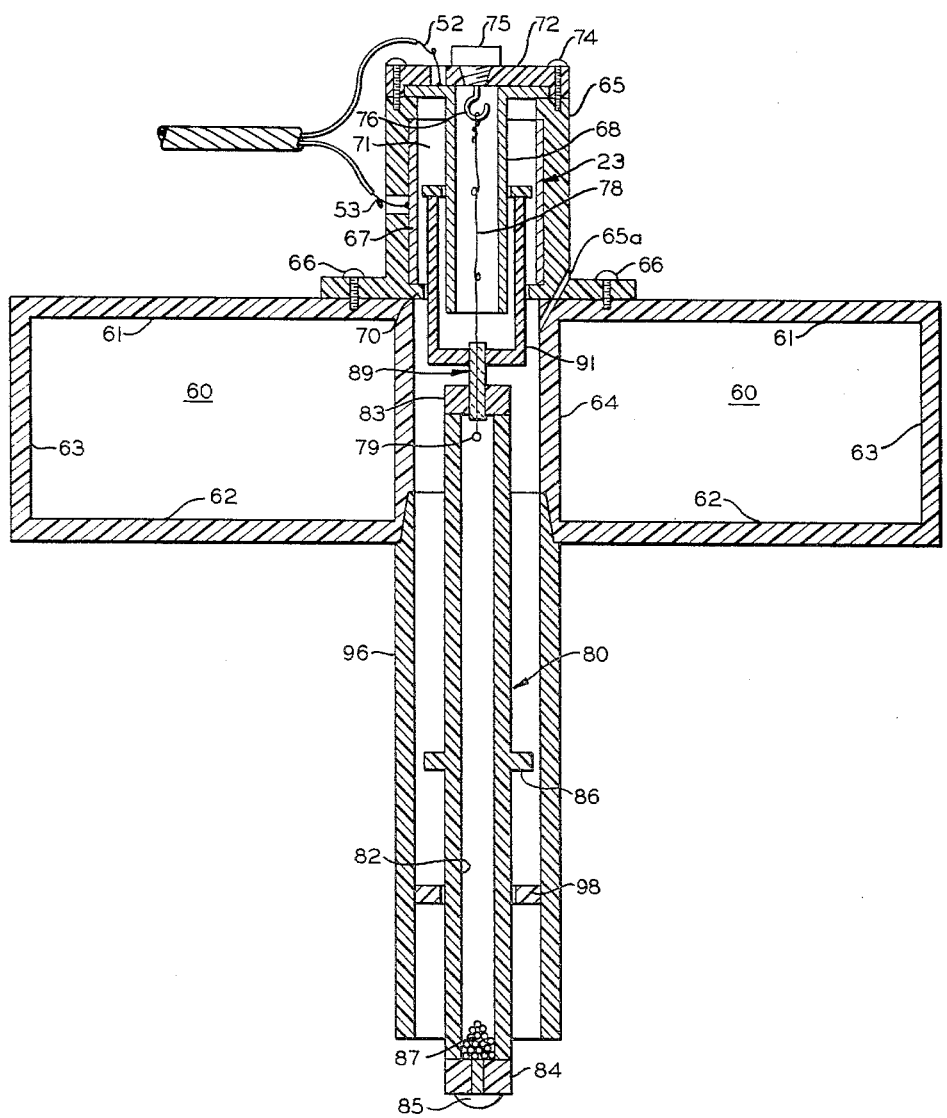

In the drawings, FIGURE 1 is a graph showing the relationship between the dielectric constant and the density of crude oils;

FIGURE 2 is a schematic representation of a specific gravity compensated capacitance bridge network for measurement of BS & W content of crude oil in accordance with the invention, and FIGURE 3 is a cross section of a preferred embodiment of the specific gravity to electrical signal transducer.

One specific application of the invention occurs in automatic custody transfer systems which transfer crude oil from storage units automatically to a pipe line. One of the measurements required in such a system is a determination of the BS & W content of the crude oil. It has been found that this measurement can be met through the utilization of a capacitance probe which is inserted into the oil to be measured. The presence of BS & W in crude oil changes the dielectric constant of the oil which in turn changes the capacitance of the measuring probe. While this system measures the BS & W content of the crude oil, serious errors are likely to occur if the specific gravity of the crude oil changes, because the dielectric constant of the crude oil, as a general rule, is a function of the specific gravity, as shown in FIGURE 1.

It is customary in many locations for crude oil to be transported by truck from producing fields to pipeline receiving stations. A wide variety of crudes can be received in each terminal station because crudes are collected from many different leases, some ranging as far as 50 miles or more away. It is desirable that the receiving stations be operated automatically, and thus some means is needed to prevent inadvertent introduction of contaminated oil into the pipeline.

In FIGURE 2 there is shown a tank 11 which can be either a storage tank into which crude oil is emptied from a tank truck or a tank truck itself. Crude is removed from tank 11 and passed by means of line 12, pump 13 and line 14 to and through BS & W monitor 15. BS & W monitor 15 contains a capacitor 16, the dielectric material of which is the crude oil flowing through the monitor. Capacitor 16 can be in a form of two or more spaced electrodes. Two specific examples of suitable measuring elements are described in J. R. Parsons U.S. Patent 2,904,751 issued September 15, 1959, the description of which is incorporated herein by reference. The crude oil is removed from monitor 15 and passed through line 17 to a three-way valve 18. A portion of the crude oil in line 17 is withdrawn through line 19 and valve 21 into hydrometer 22 having therein a specific gravity probe element 20 having a capacitor 23. Fluid is removed from hydrometer 22 through line 24 and returned to line 12.

Capacitors 16 and 23 are connected in a bridge network 25. The two terminals of capacitor 16 are connected to terminals 26 and 27 of a bridge network 25. The two terminals of capacitor 23 are connected to terminals 27 and 28 of bridge network 25. A resistor 29, a potentiometer 31, and a resistor 32 are connected in series between terminals 26 and 28, with the contactor of potentiometer 31 being connected to terminal 27, which in turn is connected to ground. A resistor 33 is connected in parallel with potentiometer 31. Resistors 34 and 35 are connected in series between terminals 26 and 28 with the junction between resistors 34 and 35 being connected to bridge terminal 36. Bridge terminals 26 and 28 are connected to respective end terminals of the secondary winding 37 of a transformer 38. While transformer 38 can be of conventional construction, the transformer disclosed in copending application Serial No. 659,683 filed May 16, 1957 by D. A. Fluegel, now U.S. Patent 3,032,729, is preferred.

The primary winding 39 of transformer 38 is energized by the output of oscillator 41. Oscillator 41 can be a conventional type, such as one utilizing a transistor with suitable tank circuits and which is adapted to produce an A.C. signal of suitable frequency, such as 40 kc. Output terminals 27 and 36 of bridge network 25 are connected to respective input terminals of high gain amplifier 42. The output terminals of amplifier 42 are connected to the input terminals of phase inverter 43, wherein the amplified signal is inverted. The output terminals of phase inverter 43 are connected to a first pair of input terminals of phase detector 44. While amplifier 42 and phase detector 44 can be of any suitable conventional design, the amplifier and phase detector disclosed in D. A. Fluegel and E. D. Tolin, U.S. Patent 2,982,911 are preferred.

The output of oscillator 41 is applied to a second pair of input terminals of phase detector 44. The output terminals of phase detector 44 are connected to control system 45. The output terminals of phase detector 44 can also be connected to recorder 46. Control system 45 can be any suitable means, such as electrical relays and associated power supplies for the operation of three-way valve 18 and pump 46.

If the BS & W content of the crude oil is less than a predetermined level, such as for example 0.5%, three-way valve 18 can be actuated by control system 45 to pass crude oil from line 17 to meter 47, wherein the amount of crude oil is metered, and then through line 48 and pump 46 to pipe line 51. If the BS & W content of the crude oil is above the predetermined level, three-way valve 18 is actuated by control system 45 to return the crude oil in line 17 through line 52 to tank 11. Control system 45 can be utilized to actuate pump 46 during such time as three-way valve 18 is passing crude oil into meter 47 and deenergize pump 46 when the crude oil in line 17 is being returned to tank 11.

The operation of FIGURE 2 will now be described. Crude oil is passed from tank 11 through BS & W monitor 15 and hydrometer 22. Any change in the specific gravity of the fluid which forms the dielectric for measuring capacitor 16 causes a change in the capacitance of compensating capacitor 23. The capacitance change of measuring capacitor 16 is responsive to changes in composition (BS & W content) of the dielectric fluid and to changes in the specific gravity of the dielectric fluid, while the capacitance change of compensating capacitor 23 is responsive to changes in the specific gravity of the dielectric material of measuring capacitor 16. Although the specific gravity of the dielectric material of measuring capacitor 16 is a function of the specific gravity of the dry crude oil and the BS & W content, the effect of the BS & W content on the specific gravity of the combined fluid is generally of such a lower order of significance than the effect of the specific gravity of the dry crude oil on the dielectric constant that the effect of the BS & W content on the specific gravity measurement in hydrometer 22 can be neglected. Bridge network 25 including capacitors 16 and 23 forms a capacitance measuring bridge. If the bridge is balanced, there is a zero potential difference between terminals 27 and 36. However, any unbalance of the bridge due to a change in the capacitance of measuring capacitor 16 and/or compensating capacitor 23 results in the potential at terminal 36 changing from ground potential. Any unbalance in the resistance arm including resistors 29, 31, 32, and 33 or any change in the loss factor of the material in the measuring capacitor 16 results in the potential at 36 changing from ground potential. This latter potential is 90° out of phase with respect to the potential due to a change in capacity of measuring capacitor 16 and/or compensating capacitor 23.

The capacitance change of compensating capacitor 23 opposes and nullifies that part of the capacitance change of measuring capacitor 16 that is due to variations in the specific gravity of the dielectric material of measuring capacitor 16. The unbalanced signal between terminals 27 and 36 is applied to the input terminals of the amplifier 42 wherein the unbalanced signal is amplified. The amplified signal is then passed to phase inverter 43. The inverted signal is applied to a first pair of input terminals of phase detector 44 while a reference signal from oscillator 41 is applied to a second pair of input terminals 44. Thus the two signals applied to phase detector 44 are of the same frequency because they are both obtained from oscillator 41.

Phase detector 44 will have a D.C. output, the magnitude of which is determined by the amplitude and phase of the A.C. signal produced by bridge network 25. When bridge network 25 is balanced the output of phase detector 44 can be set at zero or at some other value by a suitable biasing arrangement. If the capacitance of measuring capacitor 16 should become greater than that of compensating capacitor 23, bridge network 25 is unbalanced in a first direction. If the capacitance of measuring capacitor 16 becomes less than that of compensating capacitor 23, the bridge network 25 is unbalanced in the opposite direction. The phase of the output signal from the bridge thus changes by 180° when the direction of the unbalance changes. When the bridge output signal is in phase with the oscillator output, the D.C. output signal of phase detector 44 will be increased over its value for a balanced bridge condition, whereas if the bridge output signal is out of phase with the oscillator output, the output of phase detector 44 will be decreased from its value for balanced bridge condition.

A preferred embodiment of the specific gravity to electrical signal transducer 20 is shown in FIGURE 3. It comprises a main float 60 having a top 61, a bottom 62, a side wall 63, and an inner wall 64. The respective portions of 60 can preferably be made of polymethylmethacrylate, examples of which are Plexiglas and Lucite, and are secured together either by glue, screws, or other suitable fastening means. They and the other parts are preferably of circular cross-section for ease of manufacture. Where screwed fasteners are used, the respective wall must be sufficiently thick to accommodate the tapped hole without leaking either through the wall or through the hole.

Secured to the top of 61 of the main float is an electrode-supporting cap 65. This cap may be manufactured to be integral with the top 61 or it can be manufactured separately as shown and secured thereto as by a plurality of screwed fasteners 66. A vent passage 65a is drilled through the cap 65 to the interior of the float 60. The cap 65 is cup shaped having a hole in the top thereof in order to support the electrode 68 that comprises part of the capacitance unit 23. Electrode 68 has a flange at its upper end for support purposes. The second electrode or plate 67 of the unit 23 is held against the inner circumference of the cup, so that it surrounds the electrode 68, by an upper guide ring 70 that also serves to guide the hydrometer float, described below. This guide 70 is press fitted into the cup 65. The two electrodes 67 and 68 should be made of stainless steel or some similar electrically conducting and substantially noncorrodible material. A chamber 71 is defined by the annular space between the two electrodes 67 and 68. An impedance-changing member moves within this space to change the balance of the bridge 25.

The cup 65 is sealed at its upper end by a sealing member 72. Screws 74 secure the member 72 to 65. The member 72 also operates to hold the electrode 68 down against the cup 65 by engaging the flange on electrode 68. A threaded passage provided through the uppermost portion of the member 72 receives a bushing 75 having a hook 76 in the bottom thereof. A string 78 is tied to the hook and depends therefrom down to connect by means of knot 79 to the hydrometer float assembly 80. String 78 is long enough to permit full motion of the hydrometer float relative to the main float. The knot prevents string 78 from pulling loose from the hydrometer float. Electrical leads 52 and 53 are connected to their respective electrodes through appropriate holes in the cap 65 and the member 72. These electrode connections are preferably soldered. However, screwed terminals may also be used.

The hydrometer float assembly 80 is principally constructed from a length of polymethylmethacrylate (e.g. Lucite) tubing 82. The ends of the tubing are sealed by gluing bushings 83 and 84 thereto. A hydrometer float stop 86 is secured to the tubing 82 as by glue or a set screw passing through 86 and partly through 82. The hydrometer float is weighted by a plurality of lead shot 87 to remain upright when placed in a body of liquid. The shot 87 is introduced through bushing 84 by removal of the screw 85 which is threaded into 84. When lead shot is added to or removed from the hydrometer float, it increases or decreases, respectively, the sensitivity of the hydrometer as a whole: the amount the hydrometer float moves for a given specific gravity change, respectively, increases or decreases.

A member 89 secures a Teflon cup 91 to the bushing 83. This cup 91 is of such a size and shape that it fits into the chamber 71 and can move up and down therein. The material of which cup 91 is made could be made of other materials than Teflon, but should be of a material having a very low dielectric constant that is inert to the liquids and vapors to which it may be exposed. The dielectric constant should be stable with respect to temperature, i.e., should remain substantially constant over the range of temperatures expected for a given application. The purpose of this assembly is so that when the specific gravity of the liquid changes, the hydrometer float moves up and down with respect to the main float and thereby moves the cup 91, to thereby displace air or gas (with a dielectric constant of approximately 1) with Teflon (dielectric constant of approximately 2). This two-to-one change in dielectric constant results in an impedance change in bridge network 25. When the cup 91, also termed an impedance-changing member, moves up and down in the chamber 71, it thus changes the impedance of the branch of the electrical bridge 25, thus to produce an electrical signal which is representative of the specific gravity of the liquid. Member 91 has a flange at the upper end thereof to maintain its spacing from the plates of the impedance assembly 23.

A means for guiding the hydrometer float so that the impedance-changing member 91 is restrained to move up and down in the chamber 71 is provided by a larger piece of tubing 96 which is secured to the main float, and depends therefrom. The upper end of this member is shaped so that it slips into a corresponding opening in the main float 60. It is secured to the main float preferably by gluing at the upper end. Epoxy rosin glue is suitable for this purpose. A lower guide ring 98 is secured to the member 96 at a position such that it will be lower than the guide ring 86 on the hydrometer float. The guide ring 98 is disposed in this fashion because the opening therethrough is of lesser diameter than is the outside diameter of the guide ring 86, and thus serves to retain the hydrometer float inside the assembly. This permits lifting the entire assembly 20 out of the liquid in which it is floating without loosing the hydrometer float. Also, it provides a lower limit for the motion of the hydrometer float. The means for guiding 96 can be milled or cut out so that it has a generally open structure and thus permits free flow of the fluid into contact with the hydrometer float.

While the invention has been described in conjunction with a specific capacitance bridge network, the specific gravity compensation concept of the invention can be utilized with any suitable means for measuring the dielectric properties of a fluid, where the specific gravity of the fluid varies in addition to the variable it is desired to measure.

While the invention has been described in conjunction with a bridge network having the measuring capacitor in one arm of the bridge and the compensating capacitor in a second arm of the bridge, it is within the concept of the invention to utilize the compensating capacitor in parallel with the measuring capacitor whether in a capacitance measuring bridge network or in other suitable capacitance measuring means.

Also, while the specific gravity compensating system has been described utilizing a preferred gravity/capacitance probe, any suitable means for measuring the specific gravity of the dielectric fluid of the measuring capacitor 16 can be utilized in combination with means for producing a signal responsive to such measurement and means for varying the capacitance of a capacitor in response to said signal. Thus a mechanically variable condenser driven by a servo motor actuated by a signal responsive to the specific gravity of the dielectric material can be utilized.

Reasonable variation and modification are possible within the scope of the disclosure, the drawings and the appended claims to the invention.

I claim:

1. Apparatus for measuring the BS & W content of crude oil comprising:
   (1) a bridge network comprising first, second, third and fourth bridge terminals, a measuring capacitor connected between said first and second bridge terminals, means for utilizing said crude oil as the dielectric material of said measuring capacitor, an A.C. voltage source, means for connecting said voltage source across said first and third bridge terminals, a first impedance element connected between said first and fourth bridge terminals, and a second impedance element connected between said third and fourth bridge terminals;
   (2) an output circuit comprising means for amplifying the voltage between said second and fourth bridge terminals, a phase detector, means for applying the thus amplified voltage to a first input of said phase detector, and means for applying the output of said voltage source to a second input of said phase detector; and
   (3) a specific gravity compensating system comprising a main float positioned in said crude oil, a hydrometer float, a body of dielectric material secured to said hydrometer float, a second secured to said main float and having first and second spaced apart electrodes to define a chamber for receiving said body, means for restraining the motion of said body to maintain it in alignment with said chamber while relative motion occurs between said body and said second capacitor, and means connecting said second capacitor between said second and third bridge terminals.

2. Apparatus for automatically introducing into a pipeline crude oil having a BS & W content below a predetermined value, and for rejecting crude oil having a BS & W content above said predetermined value, comprising:
   (1) a transfer system comprising a BS & W monitor having a measuring capacitor, a tank, means adapted to remove crude oil from a source of crude oil and to pass at least a portion of the thus obtained crude oil through said BS & W monitor to serve as the dielectric material of said measuring capacitor, means for passing at least a portion of said thus obtained crude oil into said tank, a gravity-capacitance probe having a compensating capacitor and positioned in said tank, valve means, metering means, means for passing said thus obtained crude oil to said valve means, means adapted to return crude oil from said valve means to said source of crude oil, means connected between said valve means and said metering means to pass crude oil from said valve means to said metering means, said valve means being adapted in a first position to pass said thus obtained crude oil to said metering means, said valve means being adapted in a second position to pass said thus obtained oil to said means adapted to return, and means adapted to pass crude oil from said metering means into a pipeline;

(2) a bridge network comprising first, second, third and fourth bridge terminals, means for connecting said measuring capacitor between said first and second bridge terminals, means for connecting said compensating capacitor between said second and third bridge terminals, an A.C. voltage source, means for connecting said voltage source across said first and third bridge terminals, a first impedance element connected between said first and fourth bridge terminals, and a second impedance element connected between said third and fourth bridge terminals;

(3) an output circuit comprising means for amplifying the voltage between said second and fourth bridge terminals, a phase detector, means for applying the thus amplified voltage to a first input of said phase detector, means for applying the output of said voltage source to a second input of said phase detector, and means responsive to the output of said phase detector to change said valve means from one of said first and second positions to the other; and (4) said gravity-capacitance probe comprising a main float positioned in said crude oil, a hydrometer float, a body of dielectric material secured to said hydrometer float, said compensating capacitor being secured to said main float and having first and second spaced apart electrodes to define a chamber for receiving said body, and means for restraining the motion of said body to maintain it in alignment with said chamber while relative motion occurs between said body and said compensating capacitor.

3. Apparatus for measuring the content of a first fluid in a mixture of said first fluid and a second fluid comprising:

(1) a bridge network comprising first, second, third and fourth arms connected between first and second pairs of opposed bridge terminals, a measuring capacitor connected in one of said arms, means for utilizing said mixture as the dielectric material of said measuring capacitor, an A.C. voltage source, means for connecting said voltage source across said first pair of opposed bridge terminals, a first impedance element connected in said second arm and a second impedance element connected in said third arm;

(2) an output circuit comprising means for amplifying the voltage between said second pair of opposed bridge terminals; and (3) a specific gravity compensating system comprising a main float positioned in said mixture, a hydrometer float, a body of dielectric material secured to said hydrometer float, a second capacitor secured to said main float and having first and second spaced apart electrodes to define a chamber for receiving said body, means for restraining the motion of said body to maintain it in alignment with said chamber while relative motion occurs between said body and said second capacitor, and means connecting said second capacitor in said fourth arm of said bridge network.

4. Apparatus for automatically introducing into a pipeline crude oil having a BS & W content below a predetermined value, and for rejecting crude oil having a BS & W content above said predetermined value, comprising:

(1) a bridge network comprising first, second, third and fourth arms connected between first and second pairs of opposed bridge terminals, a measuring capacitor connected in one of said arms, an A.C. voltage source, means for connecting said voltage source across said first pair of opposed bridge terminals, a first impedance element connected in said second arm and a second impedance element connected in said third arm;

(2) an output circuit comprising means for amplifying the voltage between said second pair of opposed bridge terminals;

(3) a specific gravity compensating system comprising a main float, a hydrometer float, a body of dielectric material secured to said hydrometer float, a second capacitor secured to said main float and having first and second spaced apart electrodes to define a chamber for receiving said body, means for restraining the motion of said body to maintain it in alignment with said chamber while relative motion occurs between said body and said second capacitor, and means connecting said second capacitor in said fourth arm of said bridge network; and (4) a transfer system comprising means adapted to remove crude oil from a source of crude oil and to utilize at least a portion of the thus obtained crude oil as the dielectric material of said measuring capacitor and for supporting said main float and said hydrometer float, valve means, means for passing said thus obtained crude oil to said valve means, means adapted to return crude oil from said valve means to said source of crude oil when said valve means is in a first position; means adapted to pass crude oil from said valve means into the pipeline when said valve means is in a second position, and means responsive to the output of said output circuit to maintain said valve means in said first position when the thus determined BS & W valve is above said predetermined value and to maintain said valve means in said second position when the thus determined BS & W value is below said predetermined value.

References Cited by the Examiner

UNITED STATES PATENTS

| | | | |
|---|---|---|---|
| 2,577,612 | 12/1951 | Fay | 324—61 |
| 2,882,914 | 4/1959 | Wiley | 137—2 |
| 2,968,180 | 1/1961 | Schafer | 324—61 X |
| 2,985,826 | 5/1961 | Fluegel | 324—61 |
| 2,995,139 | 8/1961 | Remke | 137—2 |
| 3,003,353 | 10/1961 | Swadish | 73—53 |
| 3,049,910 | 8/1962 | Topol | 73—53 |
| 3,077,561 | 2/1963 | Revesz | 324—57 |
| 3,085,194 | 4/1963 | Revesz | 323—75 |

ISADOR WEIL, *Primary Examiner.*

WILLIAM F. O'DEA, R. H. MASSENGILL, *Examiners.*